(12) United States Patent
Shimahashi et al.

(10) Patent No.: US 9,886,648 B2
(45) Date of Patent: Feb. 6, 2018

(54) IMAGE PROCESSING DEVICE GENERATING ARRANGED IMAGE DATA REPRESENTING ARRANGED IMAGE IN WHICH IMAGES ARE ARRANGED ACCORDING TO DETERMINED RELATIVE POSITION

(71) Applicant: BROTHER KOGYO KABUSHIKI KAISHA, Nagoya, Aichi (JP)

(72) Inventors: Takuya Shimahashi, Nagoya (JP); Ryohei Ozawa, Nagoya (JP); Tomohiko Hasegawa, Okazaki (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 165 days.

(21) Appl. No.: 15/050,603

(22) Filed: Feb. 23, 2016

(65) Prior Publication Data
US 2016/0255281 A1 Sep. 1, 2016

(30) Foreign Application Priority Data
Feb. 27, 2015 (JP) .................................. 2015-037813

(51) Int. Cl.
| | |
|---|---|
| G09G 5/00 | (2006.01) |
| H04N 1/387 | (2006.01) |
| G06K 9/52 | (2006.01) |
| G06T 11/00 | (2006.01) |
| G06T 3/40 | (2006.01) |
| H04N 1/00 | (2006.01) |

(52) U.S. Cl.
CPC .............. *G06K 9/52* (2013.01); *G06T 3/4038* (2013.01); *G06T 11/00* (2013.01); *H04N 1/00795* (2013.01); *G06T 2207/20221* (2013.01)

(58) Field of Classification Search
CPC ................... G06T 3/4038; G06T 2207/20221
USPC .......................................... 345/635; 358/450
See application file for complete search history.

(56) References Cited

U.S. PATENT DOCUMENTS

| | | | |
|---|---|---|---|
| 5,481,375 A | 1/1996 | Eto et al. | |
| 5,708,513 A | 1/1998 | Hasuo et al. | |
| (Continued) | | | |

FOREIGN PATENT DOCUMENTS

| | | |
|---|---|---|
| JP | H06-164893 A | 6/1994 |
| JP | H07-283933 A | 10/1995 |
| JP | 2004-061446 A | 2/2004 |

*Primary Examiner* — Ryan R Yang
(74) *Attorney, Agent, or Firm* — Scully, Scott, Murphy & Presser, PC

(57) ABSTRACT

An image processing device acquires first image data representing a first image and second image data representing a second image. The first image shows a part of a target object and the second image showing another part of the target object. The first image includes a first edge. The image processing device generates a plurality of first pixels so as to be arranged outside the first image and along the first edge by using a plurality of pixels that are arranged inside the first image and along the first edge. The image processing device determines a relative position between the first image and the second image by using the plurality of first pixels. The image processing device generates arranged image data representing an arranged image in which the first image and the second image are arranged according to the relative position so that the arranged image shows the target object.

13 Claims, 10 Drawing Sheets

(56) References Cited

U.S. PATENT DOCUMENTS

| | | | |
|---|---|---|---|
| 6,215,914 B1* | 4/2001 | Nakamura | H04N 1/3876 |
| | | | 348/584 |
| 6,549,681 B1* | 4/2003 | Takiguchi | G06T 3/4038 |
| | | | 358/450 |
| 6,771,304 B1* | 8/2004 | Mancuso | G06T 3/403 |
| | | | 348/39 |
| 7,009,638 B2* | 3/2006 | Gruber | G01C 11/02 |
| | | | 348/144 |
| 8,547,602 B2* | 10/2013 | Suzuki | H04N 1/387 |
| | | | 358/448 |
| 2004/0022418 A1 | 2/2004 | Oota | |
| 2011/0128289 A1* | 6/2011 | Zingaretti | G06T 7/0014 |
| | | | 345/428 |
| 2015/0070523 A1* | 3/2015 | Chao | H04N 5/23216 |
| | | | 348/218.1 |

* cited by examiner

ORIGINAL

ORIGINAL

READING OPERATION (FIRST PASS)

READING OPERATION (SECOND PASS)

SCAN IMAGE

CORRECTED SCAN IMAGE

FIG. 5(A) SCAN IMAGES WITH RESTORED IMAGES
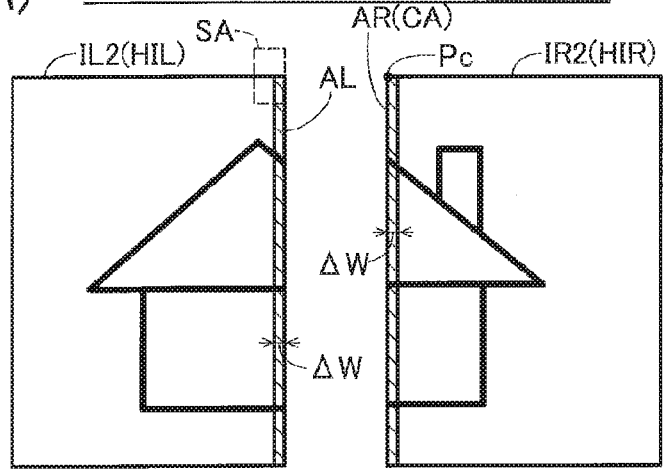
FIG. 5(B) ARRANGED IMAGE
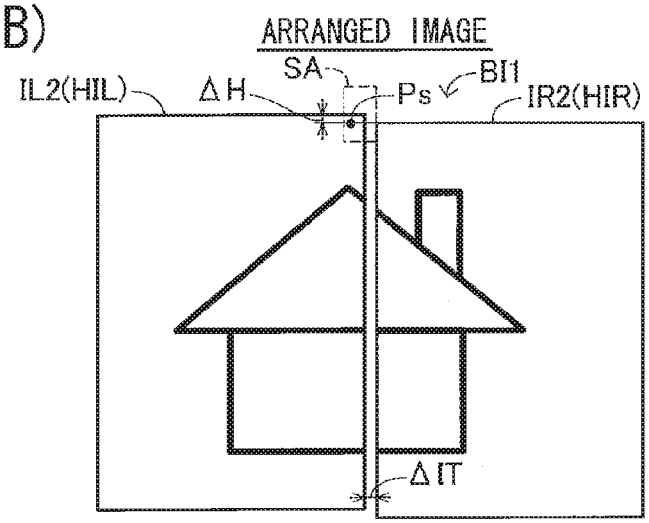
FIG. 5(C) SIZE ADJUSTED ARRANGED IMAGE
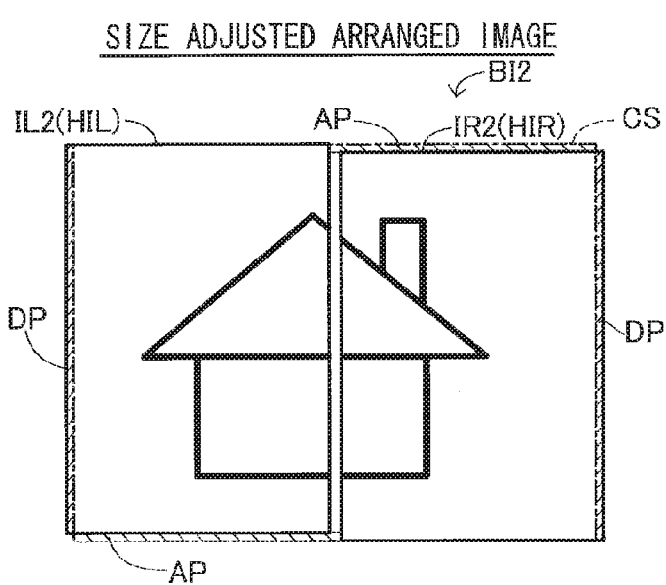

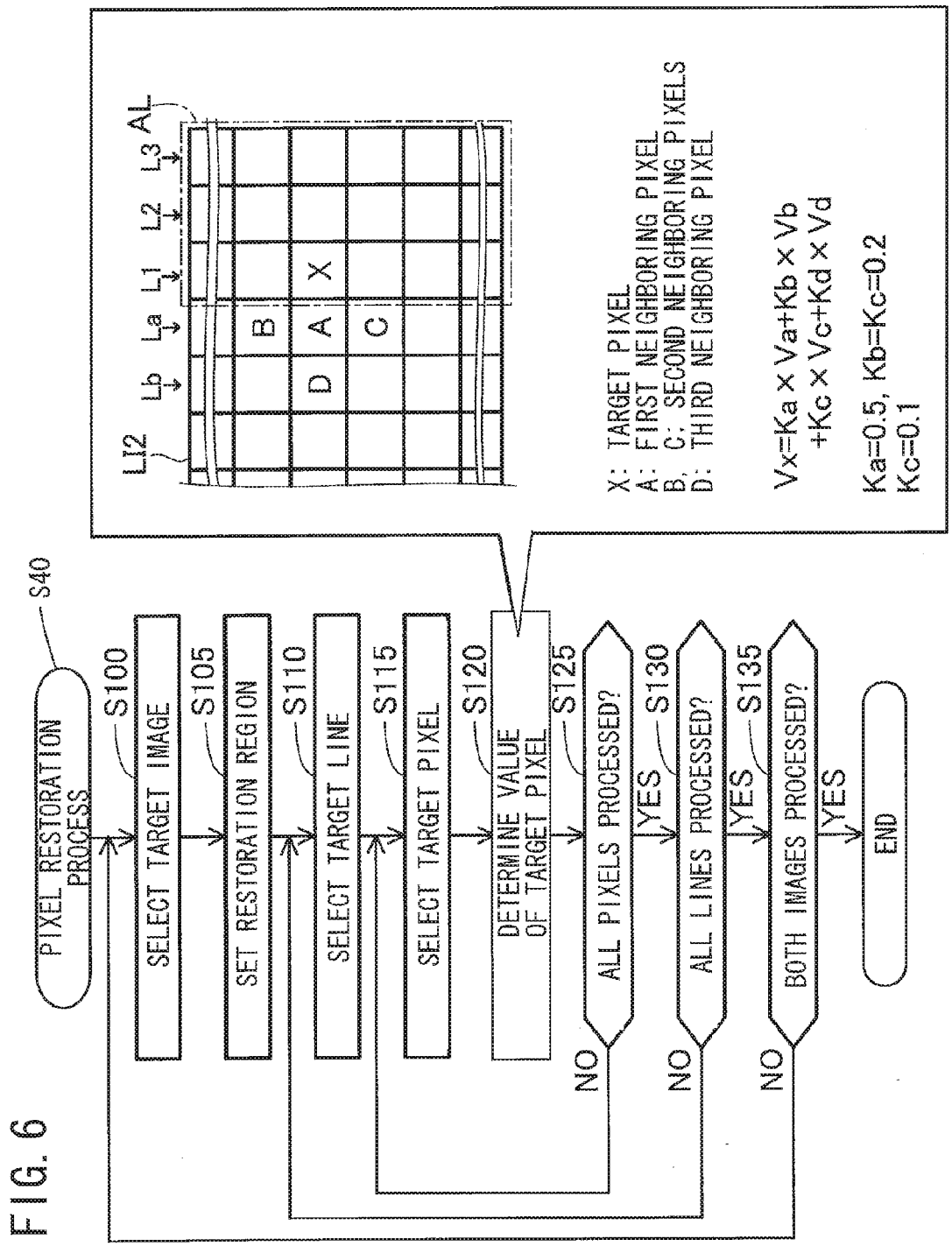

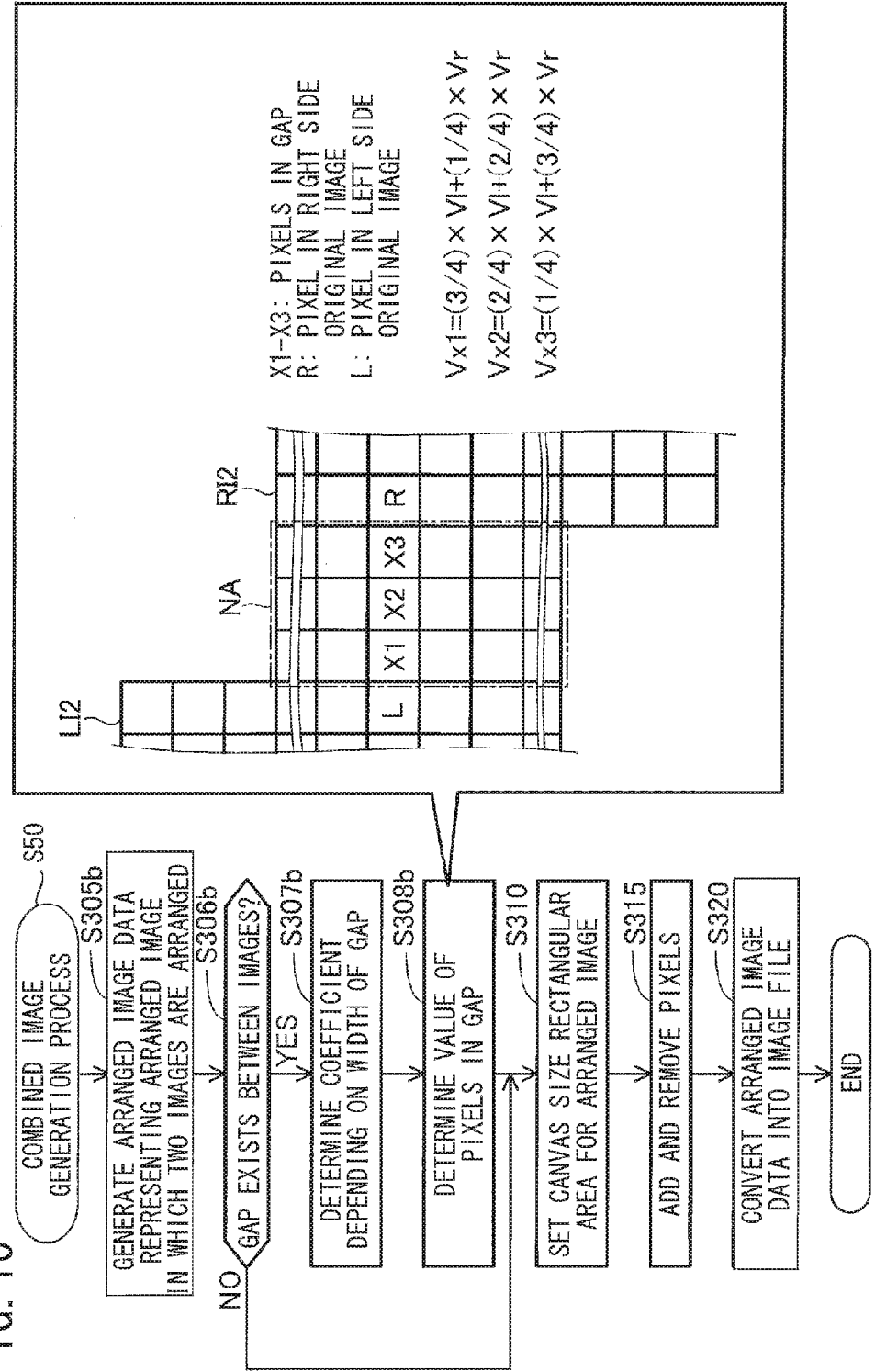

IMAGE PROCESSING DEVICE GENERATING ARRANGED IMAGE DATA REPRESENTING ARRANGED IMAGE IN WHICH IMAGES ARE ARRANGED ACCORDING TO DETERMINED RELATIVE POSITION

CROSS REFERENCE TO RELATED APPLICATION

This application claims priority from Japanese Patent Application No. 2015-037813 filed Feb. 27, 2015. The entire content of the priority application is incorporated herein by reference.

TECHNICAL FIELD

The present disclosure relates to a technique for generating arranged image data representing a single arranged image formed by combining a first image and a second image.

BACKGROUND

There is known a technique for generating an arranged image file that represents an arranged image. In the arranged image, a first image and a second image are arranged. For example, a document of a size that is too large to be read at once is read by a scanner in two stages, and scan data of a first image and scan data of a second image are acquired as a result. An image file is generated so that the image file represents, as an entire sheet of an original, an arranged image in which the first and second images are arranged by using the two sets of scan data. The positions of the first and second images arranged in the arranged image are determined by extracting, for each of the two images, characteristics of a region along one side of the respective image, and comparing the extracted characteristics of the two images.

SUMMARY

However, if one document is read in multiple scans, there is a case where parts of the document does not appear on any of a plurality of scan images represented by a plurality of sets of scan data. For example, if the document is folded before being read, a folded portion of the document does not appear on any of a plurality of scan images. As a result, in the arranged image in which the first and second images are arranged, the positions of the first and second images could not be determined accurately.

In view of the foregoing, it is an object of the disclosure to provide a technique for accurately determining the arrangement positions of the first and second images when generating an arranged image file that represents an arranged image in which the first and second images are arranged to show one object (e.g., one sheet of an original).

In order to attain the above and other objects, the disclosure provides an image processing device. The image processing device includes a processor; and a memory storing computer-readable instructions therein. The computer-readable instructions, when executed by the processor, causes the image processing device to perform: acquiring first image data representing a first image and second image data representing a second image, the first image showing a part of a target object and the second image showing another part of the target object, the first image including a first edge; generating a plurality of first pixels so as to be arranged outside the first image and along the first edge by using a plurality of pixels that are arranged inside the first image and along the first edge, the plurality of first pixels not being included in the first image; determining a relative position between the first image and the second image by using the plurality of first pixels; and generating arranged image data representing an arranged image in which the first image and the second image are arranged according to the relative position so that the arranged image shows the target object.

According to another aspects, the disclosure provides a non-transitory computer readable storage medium storing a set of program instructions installed on and executed by a computer. The program instructions includes: acquiring first image data representing a first image and second image data representing a second image, the first image showing a part of a target object and the second image showing another part of the target object, the first image including a first edge; generating a plurality of first pixels so as to be arranged outside the first image and along the first edge by using a plurality of pixels that are arranged inside the first image and along the first edge, the plurality of first pixels not being included in the first image; determining a relative position between the first image and the second image by using the plurality of first pixels; and generating arranged image data representing an arranged image in which the first image and the second image are arranged according to the relative position so that the arranged image shows the target object.

According to another aspects, the disclosure provides a method. The method includes acquiring first image data representing a first image and second image data representing a second image, the first image showing a part of a target object and the second image showing another part of the target object, the first image including a first edge; generating a plurality of first pixels so as to be arranged outside the first image and along the first edge by using a plurality of pixels that are arranged inside the first image and along the first edge, the plurality of first pixels not being included in the first image; determining a relative position between the first image and the second image by using the plurality of first pixels; and generating arranged image data representing an arranged image in which the first image and the second image are arranged according to the relative position so that the arranged image shows the target object.

BRIEF DESCRIPTION OF THE DRAWINGS

The particular features and advantages of the disclosure as well as other objects will become apparent from the following description taken in connection with the accompanying drawings, in which:

FIG. 5(A) is a diagram showing scan images and restoration regions;

FIG. 5(B) is a diagram showing an example of an arranged image;

FIG. 5(C) is a diagram showing an arranged image whose size is adjusted;

FIG. 6 is a flowchart for illustrating a pixel restoration process according the first embodiment;

FIG. 10 is a flowchart illustrating an arranged image generation process according a second embodiment.

DETAILED DESCRIPTION

A. First Embodiment

A-1: Structure of an Image Processing System

Figure 1:
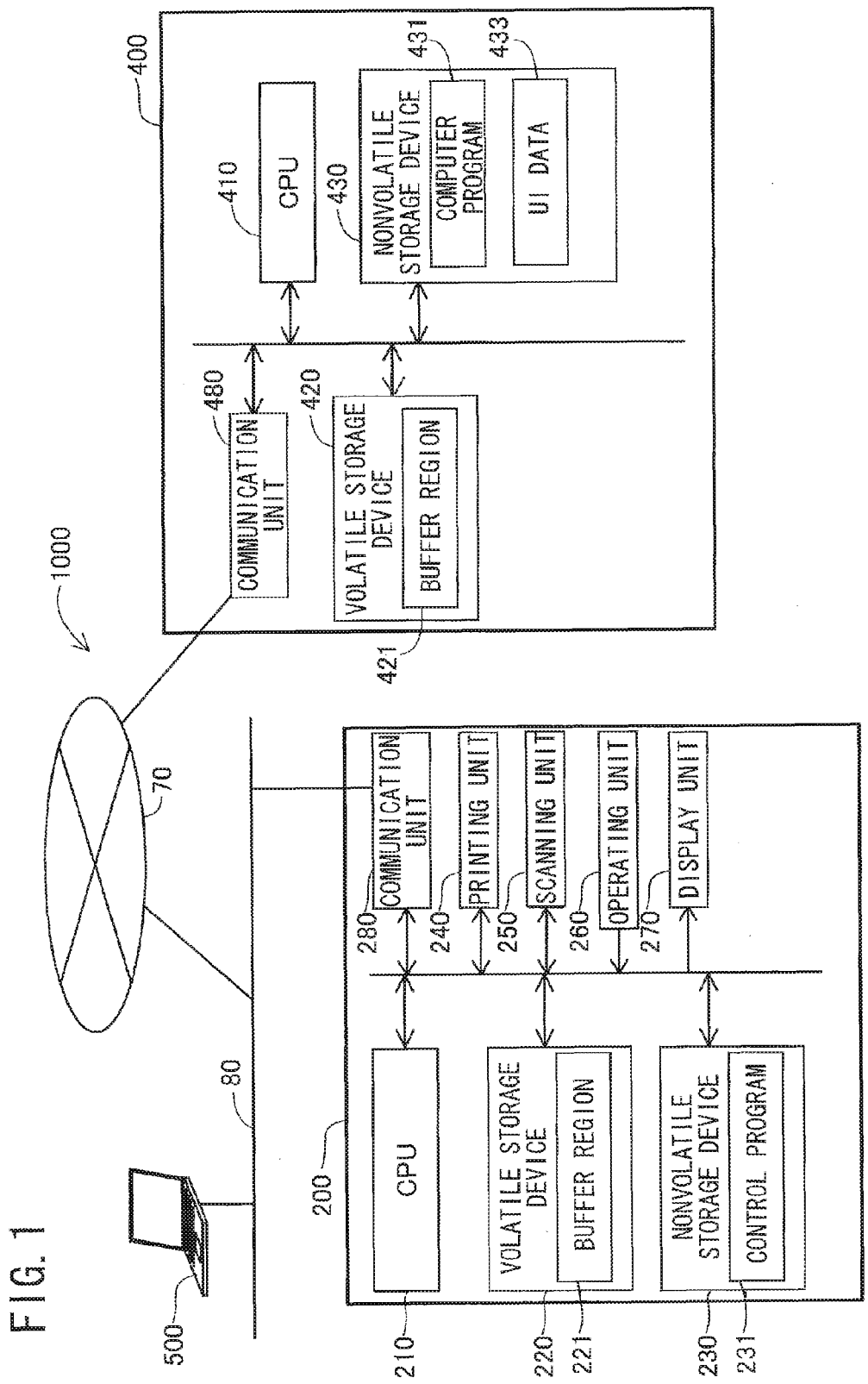
FIG. 1 is a block diagram showing a structure of an image processing system according to a first embodiment.

FIG. 1 is a block diagram showing the structure of an image processing system 1000 according to a first embodiment. The image processing system 1000 is configured of a server 400 functioning as an image processing device, and a multifunction peripheral 200. The server 400 is connected to an Internet 70. The multifunction peripheral 200 is also connected to the Internet 70 via a local area network (LAN) 80. Consequently, the server 400 and the multifunction peripheral 200 can communicate with each other via the LAN 80 and the Internet 70. Further, a personal computer 500 possessed by the user of the multifunction peripheral 200 may be connected to the LAN 80. In this case, the image processing system 1000 may not include the personal computer 500.

The server 400 includes a CPU 410, as an example of the processor, for processing data; a volatile storage device 420, such as DRAM; a nonvolatile storage device 430, such as a hard disk drive or flash memory; and a communication unit 480 including an interface for connecting to the Internet 70 or other networks. The volatile storage device 420 is provided with a buffer region 421 for temporarily storing various intermediate data generated when the CPU 410 performs processes. The nonvolatile storage device 430 stores a computer program 431, and user interface (UI) data 433.

The computer program 431 and the UI data 433 are installed on the server 400 by the administrator of the server 400, for example, by uploading this data to the server 400 through the Internet 70. Alternatively, the computer program 431 and the UI data 433 may be supplied on a DVD-ROM or other storage media and installed on the server 400 by the administrator. The CPU 410 executes the computer program 431 to implement an image process described later.

The multifunction peripheral 200 includes a CPU 210 as an example of a processor, for processing data; a volatile storage device 220, such as DRAM; a nonvolatile storage device 230, such as flash memory or a hard disk drive; a printing unit 240; a scanning unit 250; an operating unit 260, such as a touchscreen, buttons, or the like; a display unit 270, such as a liquid crystal display; and a communication unit 280 for communicating with external devices. The communication unit 280 includes an interface for connecting to the LAN 80 or another network, and an interface for connecting to a USB memory or another external storage device, for example.

The volatile storage device 220 is provided with a buffer region 221 that temporarily stores various data generated when the CPU 210 performs processes. The nonvolatile storage device 230 stores a control program 231. The control program 231 is pre-stored in the nonvolatile storage device 230 when the printer 100 is manufactured. Alternatively, the control program 231 may be provided by being downloaded from an external server (for example, the server 400) via the Internet 70 or may be provided on the CD-ROM or other storage media.

The printing unit 240 executes printing operations according to an inkjet or laser printing method, for example. The scanning unit 250 produces scan data representing a color or grayscale image by optically reading an original using a photoelectric conversion element such as a CCD (Charge Coupled device) sensor or CMOS (Complementary Metal-Oxide Semiconductor) sensor. The scanning unit 250 is provided with a flatbed 255 as a platen for reading an original (see FIG. 3(C)).

The CPU 210 controls the multifunction peripheral 200 by executing the control program 231. For example, the CPU 210 can control the printing unit 240 and the scanning unit 250 to execute a copy process, a print process, and a scan process. Further, the CPU 210 can execute a service use process for accessing the server 400 to use services provided thereby.

A-2: Operations of the Image Processing System

Figure 2:
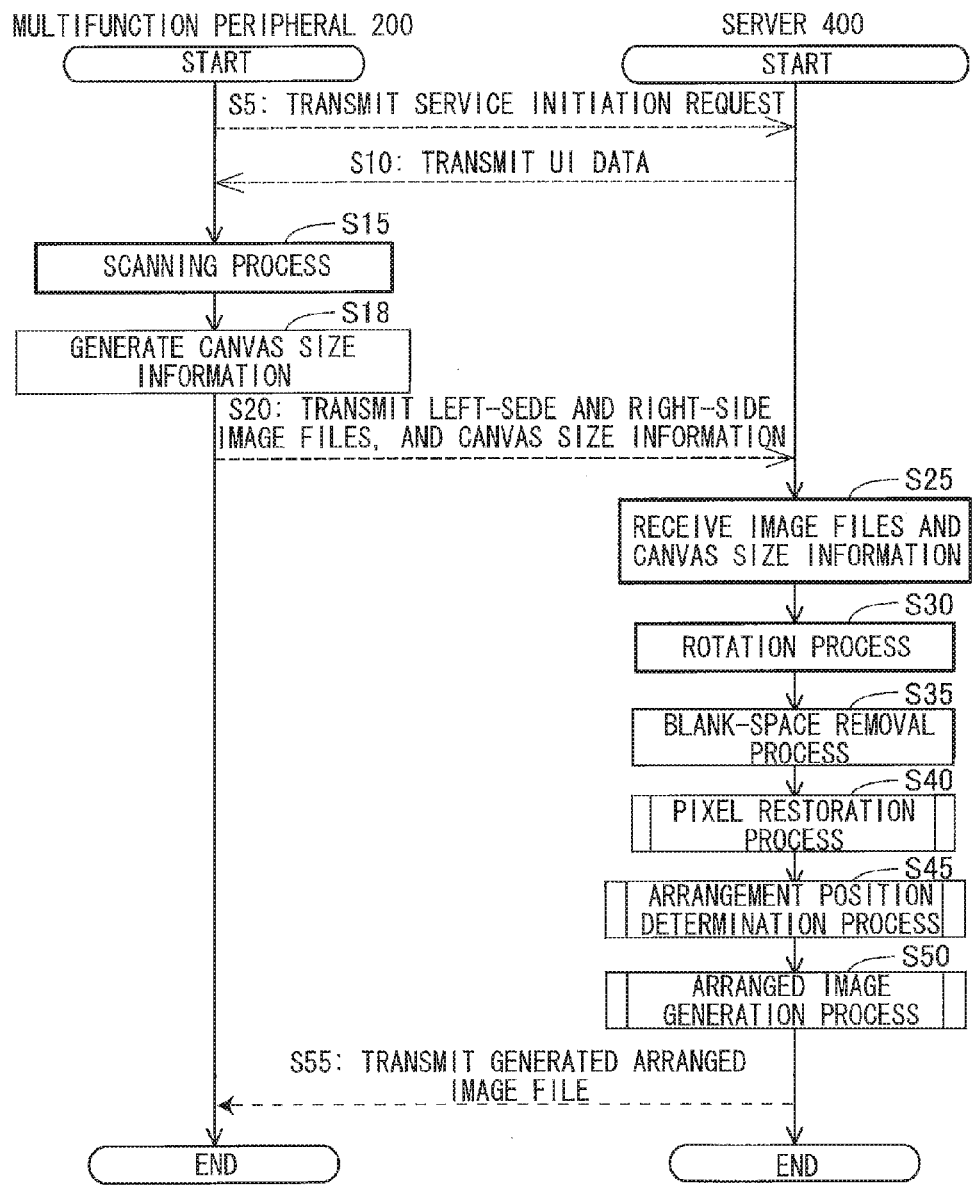
FIG. 2 is a sequence of operations performed by the image processing system for an image generation service according the first embodiment.

FIG. 2 shows the sequence of operations performed by the image processing system 1000 for an image generation service. The multifunction peripheral 200 initiates the process in FIG. 2 upon receiving a command from the user to use the image generation service provided by the server 400. This service will be described later in greater detail and entails generating arranged image data representing an arranged image in which a plurality of scanned images are arranged. Here, the arranged image shows a single target object (an original 10, for example) and the plurality of scanned images are represented by a plurality of sets of scan data obtained. As will be described later in greater detail, a plurality of sets of scan data is generated when the scanning unit 250 performs a plurality of passes to read an original that is larger than the maximum size that the scanning unit 250 can read in one pass, for example.

In S5 at the beginning of the process in FIG. 2, the CPU 210 of the multifunction peripheral 200 transmits a service initiation request to the server 400. Upon receiving this request, the CPU 410 of the server 400 selects UI data required for providing the image generation service from the UI data 433 shown in FIG. 1 and in S10 transmits this UI data to the multifunction peripheral 200. The UI data specifically includes screen data representing a user interface screen (hereinafter called a "UI screen"), and control data. The control data includes various data required for the multifunction peripheral 200 to perform a prescribed process, such as the scan process described later in S15, using the UI screen. For example, the control data includes data that the multifunction peripheral 200 needs when performing processes that the multifunction peripheral 200 should execute, such as, the destination address for the image data. The processes that the multifunction peripheral 200 should execute includes a process of S20 to transmit an image file and canvas size information to the server 400.

In S15 the CPU 210 executes a scanning process (hereinafter called a "reading process") to generate a plurality of sets of scan data on the basis of the UI data received in S10. In the reading process of the embodiment, the CPU 210 generates two sets of scan data by reading a first approximate half portion of an original prepared by the user, and subsequently reading the remaining approximate half portion of the original. The scan data generated in the embodiment is RGB image data that includes RGB component values (each value indicating one of 256 gradations between 0 and 255, for example) for each pixel in the image. The scan data has a resolution of 300 dpi in the vertical and horizontal directions.

Figure 3A:
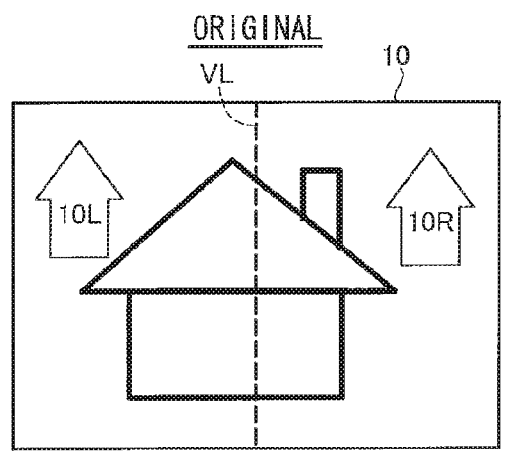
FIG. 3(A) is a diagram showing an example of an original.

FIGS. 3(A) to 3(D) are explanatory diagrams for the scan process. FIG. 3(A) shows one example of an original used in the embodiment. In this example, the size of the original 10 is A3. A left region 10L is substantially a left-half region of the original 10, and a right region 10R is substantially a right-half region of the original 10. The size of the left region 10L and the size of the right region 10R is A4. The A3-size and A4-size are paper sizes defined by ISO (International Organization for Standardization) 216.

Arrows in the regions 10L and 10R in the drawings show the positions and directions of the regions 10L and 10R. That is, in the drawings, the regions 10L and 10R are arranged at the positions where the arrows are placed, and arranged in the directions specified by the arrows. That is, the arrows shown in drawings indicate upward direction of the original 10 (or an image of original 10). FIGS. 3(C) and 3(D) do not show images inside the regions 10L and 10R. In FIGS. 3(C) and 3(D), only the arrows with reference numerals show the positions and directions of the regions 10L and 10R.

The length of the document table 255 of the scanner unit 250 in the longitudinal direction (FIGS. 3(C) and 3(D)) is slightly longer (e.g., by several centimeters) than that is the length of the A4 size in the longitudinal direction (297 mm). The length of the document table 255 in the short side direction is slightly longer (e.g., by several centimeters) than the length of a letter size in the short side direction (215.9 mm). Here, the letter size is defined by ANSI/ASME (American National Standards Institute/American Society of Mechanical Engineers) Y14.1. In the embodiment, the maximum size of a document that can be read at once is greater than the A4 size but smaller than the A3 size. In the embodiment, as described above, the A3-size original 10 is read in two passes.

Figure 3B:
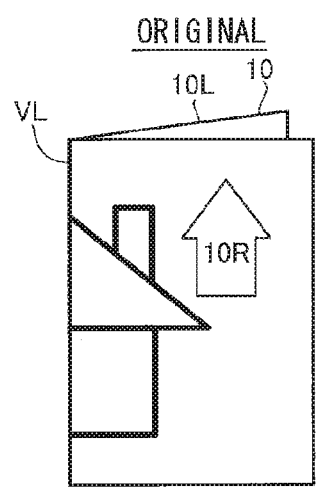
FIG. 3(B) is a diagram showing the folded original.
Figure 3C:
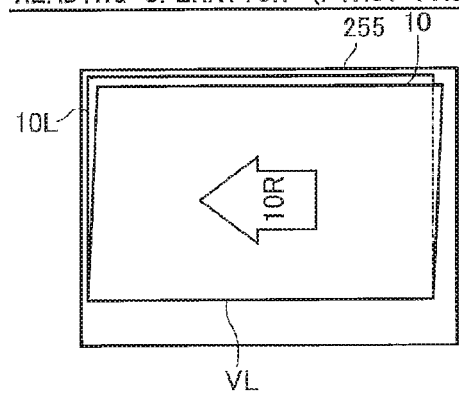
FIG. 3(C) is an explanatory diagram illustrating scan processes for scanning a left region of the original.
Figure 3D:
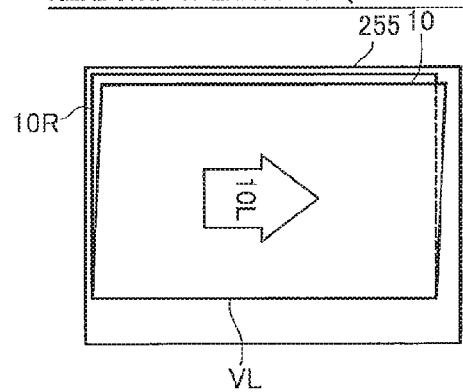
FIG. 3(D) is an explanatory diagram illustrating the scan process for scanning a right region of the original.

More specifically, in the embodiment, as shown in FIG. 3(B), the original 10 is folded in half along line VL before being read by the scanner unit 250. In the embodiment, as shown in FIG. 3(A), the line VL is at the center of the A3-size original 10 in the longitudinal direction and is parallel to the short side of the original 10. After being folded in half, the size of the original 10 turns out to be A4. The right region 10R is on one side of the half-folded original 10, and the left region 10L is on the other side.

In the first reading process (the first pass), left-side scan data representing an image within the left region 10L is generated. More specifically, the CPU 210 displays an UI screen (not shown) on the display unit to prompt a user to put the original 10 on the document table 255 in a state shown in FIG. 3(C). The user puts the half-folded original 10 on the document table 255 so that the left region 10L faces the document table 255 and that the right region 10R faces the opposite side of the document table 255, as shown in FIG. 3(C). At this time, the half-folded original 10 is placed on the document table 255 so that the line VL is on the near side (bottom side in FIG. 3(C)) and that the upper left corner of the original 10 shown in FIG. 3(C) is approximately at the upper left corner of the document table 255. After the user inputs a read command to the multifunction peripheral 200, the CPU 210 controls the scanner unit 250 to read the left region 10L and generate the left-side scan data.

In the second reading process (the second pass), right-side scan data representing an image within the right region 10R is generated. More specifically, the CPU 210 displays an UI screen (not shown) on the display unit to prompt a user to put the original 10 on the document table 255 in a state shown in FIG. 3(D), after the generation of the left-side scan data. The user puts the half-folded original 10 on the document table 255 so that the right region 10R faces the document table 255 and that the left region 10L faces the opposite side of the document table 255, as shown in FIG. 3(D). At this time, the half-folded original 10 is placed on the document table 255 so that the line VL is on the near side (bottom side in FIG. 3(D)) and that the upper left corner of the original 10 shown in FIG. 3(D) is approximately on the upper left corner of the document table 255. After the user inputs a read command to the multifunction peripheral 200, the CPU 210 controls the scanner unit 250 to read the right region 10R and generate the right-side scan data.

Figure 4A:
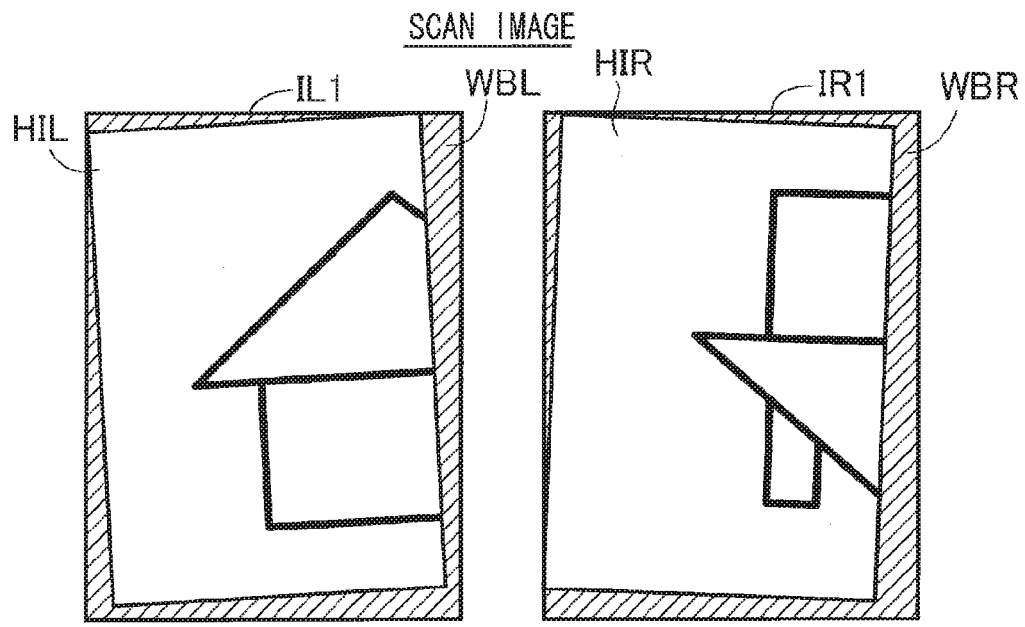
FIG. 4(A) is a diagram showing a left-side scan image and a right-side scan image.
Figure 4B:
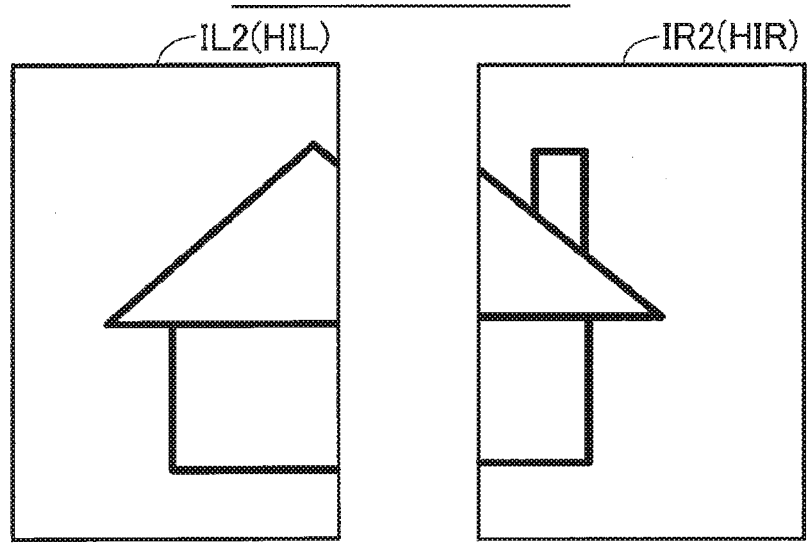
FIG. 4(B) is a diagram showing a corrected left-side scan image and a corrected right-side scan image.

FIGS. 4(A) and 4(B) are diagrams showing one example of the scan image. FIG. 4(A) shows a left-side scan image IL1 and a right-side scan image IR1. The left-side scam image IL1 is represented by the left-side scan data, and the right-side scan image IR1 is represented by the right-side scan data. The left-side scan image IL1 has a left-side original image HIL, which shows the left region 10L of the original 10, and a blank space WBL. The right-side scan image IR1 has a right-side original image HIR, which shows the right region 10R of the original 10, and a blank space WBR.

The left-side original image HIL is tilted in the left-side scan image IL1. This is because, in the generation of the left-side scan data, the original 10 placed on the document table 255 was tilted. The same is true for the right-side original image HIR, which is tilted in the right-side scan image IR1.

The scan images IL1 and IR1 has a rectangular shape that matches the shape of the document table 250 shown in FIGS. 3(C) and 3(D). The scan images IL1 and IR1 represent images arranged on the document table 255, with the direction along the long side of the document table 255 regarded as a vertical direction, and the leftward direction of the document table 255 shown in FIGS. 3(C) and 3(D) as an upward direction. The upward direction (or the direction of arrow in FIG. 3(C)) of the original 10 on the document table 255 during the reading of the left region 10L is opposite to the upward direction (or the direction of arrow in FIG. 3D) of the original 10 on the document table 255 during the reading of the right region 10R. Accordingly, the top-to-bottom direction of the left-side original image HIL in the left-side scan image IL1 is opposite to the top-to-bottom direction of the right-side original image HIR in the right-side scan image IR1.

In the scan process of S15, the left-side scan data and the right-side scan data are converted into files of a predetermined format, such as image files of JPEG (Joint Photographic Experts Group) format.

In S18 of FIG. 2, the CPU 210 generates canvas size information on the basis of an instruction from the user. The canvas size information specifies the size of an arranged image represented by an arranged image file, which is described later. More specifically, the CPU 210 generates the canvas size information that shows the size of the arranged image on the basis of the size of the arranged image specified by the user via an UI screen (not shown). For example, the size of the arranged image is A3-size or letter size. The size is generally the same as that of the original 10.

In S20 of FIG. 2, the CPU 210 transmits the image file of the left-side scan data (also referred to as left-side image file), the image file of the right-side scan data (also referred to as right-side image file), and the canvas size information to the server 400. As a result, in S25, the CPU 410 of the server 400 receives the two image files and the canvas size information. The CPU 410 retrieves the left-side scan data and right-side scan data from the image files and stores the data in the buffer region 421. For example, if the image files in JPEG format are used, the CPU 410 acquires scan data that are RGB image data converted from the image files by a predetermined conversion process, and stores the scan data in the buffer region 421.

In S30, the CPU 410 performs a rotation process on the left-side scan data and the right-side scan data. More specifically, the CPU 410 performs well-known processes, such as a Hough transform and an edge detection process, on the left-side scan data in order to detect the left side of the left-side original image HIL in the scan image IL1. The CPU 410 rotates the left-side scan image IL1 so that the left side of the left-side original image HIL is parallel to the vertical direction of the image, and thereby generates rotated left-side scan data that represents a rotated left-side scan image (not shown). The CPU 410 also performs a rotation process on the right-side scan data similarly to the rotation process on the left-side scan data. The CPU 410 rotates the right-side scan image IR1 so that the left side of the right-side original image HIR is parallel to the vertical direction of the image. Moreover, the CPU 410 turns the right-side scan image IR1 180 degrees so that the top-to-bottom direction of the right-side original image HIR matches the top-to-bottom direction of the left-side original image HIL. In this manner, the CPU 410 generates rotated right-side scan data that shows a rotated right-side scan image (not shown).

In S35, the CPU 410 performs a blank-space removal process on the rotated left-side scan data and the rotated right-side scan data. More specifically, the CPU 410 detects four sides of the left-side original image HIL in the rotated left-side scan image in order to identify the left-side original image HIL inside the rotated left-side scan image. The CPU 410 removes, as a blank space, a portion of the rotated left-side scan image that is outside the left-side original image HIL. Similarly to the blank-space removal process on the left-side scan image, the CPU 410 removes, as a blank space, a portion of the rotated right-side scan image that is outside the right-side original image HIR. FIG. 4(B) shows a corrected left-side scan image IL2 and a corrected right-side scan image IR2. The corrected left side scan image IL2 is represented by the left-side scan data on which the turning and blank-space removal processes are performed, and the corrected right-side scan image IR2 is represented by the right-side scan data on which the rotation and blank-space removal processes are performed. The image data that represents the corrected left-side scan image IL2 is a scan image that has the left-side original image HIL and does not have any blank space. The corrected right-side scan image IR2 is a scan image that has the right-side original image HIR and does not have any blank space. In the subsequent processes, a blank space is not required, and only the left-side original image HIL and the right-side original image HIR are needed. Accordingly, in the embodiment, the CPU 410 removes the blank space from the image data. However, without removing the blank space, the CPU 410 may only identify the left-side original image HIL and the right-side original image HIR from the rotated left-side scan image and the rotated right-side scan image, respectively.

In S40, the CPU 410 performs a pixel restoration process to restore missing pixels in the scan images IL2 and IR2 or original images HIL and HIR. FIGS. 5(A) to 5(C) are diagrams showing one example of an image that is used in an image process of the server 400. FIG. 5(A) shows the scan images IL2 and IR2, and restoration regions AL and AR. A plurality of pixels restored by the pixel restoration process are located in each of the restoration regions AL and AR. As shown in FIG. 4(A), the scan images IL2 and IR2 are images that are generated by reading the half-folded original 10. Accordingly, an image in a very narrow area located on the line VL of the original 10 appears neither on the scan image IL2 nor on the scan image IR2, and the image is missing. The restoration regions AL and AR of FIG. 5(A) correspond to the very narrow area located on the line VL of the original 10.

The left-side restoration region AL is a region that is located on an end of the left-side original image HIL in the example of FIG. 5(A). Here, the end of the left-side original image HIL corresponds to the line VL. In other words, the left-side restoration region AL is a region that is located along the right end of the left-side original image HIL and outside the left-side original image HIL in the example of FIG. 5(A). The left-side restoration region AL is a very narrow linear region that extends along the entire length of the right end of the original image HIL from an upper end to a lower end. The right-side restoration region AR is a region that is located at an end corresponding to the line VL of the right-side original image HIR, or a region that is located along the left end of the right-side original image HIR and outside the right-side original image HIR in the example of FIG. 5(A). The right-side restoration region AR is a very narrow linear region that extends along the entire length of the left end of the right-side original image HIR from an upper end to a lower end. As shown in FIG. 5(A), a width ΔW in the horizontal direction, that is, the width in a direction perpendicular to an end of the restoration region AL or AR, has a value that is determined in advance by experiments. Here, the end of the restoration region AL or AR corresponds to the line VL. In the embodiment, the width ΔW is set at three pixels when the resolution is 300 dpi in the horizontal direction of the original images HIL and HIR. That is, the width ΔW is 1% of the number of pixels within one inch determined by the resolution in the horizontal direction, in the embodiment. Both the right end of the left-side original image HIL and the left end of the right-side original image HIR represent a portion of the line VL in the original 10. Therefore, the right end of the left-side original image HIL corresponds to the left end of the right-side original image HIR.

FIG. 6 is a flowchart for illustrating the pixel restoration process. In S100, the CPU 410 selects a target image from the left-side original image HIL and the right-side original image HIR. In S105, the CPU 410 sets the above-described restoration region on the target image. For example, if the left-side original image HIL is a target image, the left-side restoration region AL is set along the right end of the left-side original image HIL.

In S110, the CPU 410 selects a target line in the restoration region. In the embodiment, the width ΔW of the restoration region in the horizontal direction is three pixels, for example. That is, the restoration region has three pixel lines. Each line extends in the top-to-bottom direction. The CPU 410 sequentially selects one target line out of the three pixel lines from the side close to the target image. For example, as shown in the right section of FIG. 6, the left-side restoration region AL has three lines L1 to L3. If the left-side original image HIL is a target image, the CPU 410 first selects the line L1 as a target line, secondly the line L2 as a target line, and finally the line L3 as a target line.

In S115, the CPU 410 selects one target pixel from among a plurality of pixels included in the target line. For example, the CPU 410 sequentially selects, from top to bottom, a target pixel from among a plurality of pixels included in the target line.

In S120, the CPU 410 determines a value of the target pixel (or RGB value in the embodiment) by using values of a plurality of pixels neighboring the target pixel. If the left-side original image HIL is a target image, the value of a target pixel is determined on the basis of values of four neighboring pixels that are located on the left side of the target pixel. For example, if pixel X on the line L1 shown in the right section of FIG. 6 is a target pixel, the four neighboring pixels are three pixels A, B, and C on a neighboring line La that is on the left side of the line L1, and one pixel D on a neighboring line Lb that is on the left side of the line La. The pixel A is a first neighboring pixel that is closest to the target pixel among the pixels located on the left side of the target pixel. The pixels B and C are second neighboring pixels that are the second closest to the target pixel. The pixel D is a third neighboring pixel that is the third closest to the target pixel. A specific component value (e.g., R-component value) Vx of the pixel X is calculated by the following equation (1) with the use of specific component values Va to Vd. The specific component values Va to Vd are component values of the pixels A to D, respectively.

$$Vx=Ka \times Va+Kb \times Vb+Kc \times Vc+Kd \times Vd \quad (1)$$

Each of values Ka-Kd are coefficients that are determined in advance on the basis of the corresponding distance between the pixel X and the corresponding one of the pixels A-D. Specifically, the coefficients Ka to Kd are determined so that the sum of the coefficients Ka-Kd is 1 and so that the shorter the corresponding distance from the pixel X, the larger values the coefficients Ka-Kd have. In the embodiment, Ka=0.5, Kb=Kc=0.2, and Kd=0.1.

The CPU 410 uses the equation (1) to calculate three component values of the target pixel. In this manner, the RGB values of the target pixel are determined.

Although not shown in the drawings, if the right-side original image HIR is a target image, the values of a target pixel are determined on the basis of the values of four neighboring pixels located on the right side of the target pixel, similarly to the left-side original image HIL. The CPU 410 may calculate component values of the target pixel using pixels in the neighboring lines (La and Lb, for example) in a different manner described above.

In S125, the CPU 410 determines whether all pixels on the target line have been processed as the target pixel. If there is an unprocessed pixel (S125: NO), the CPU 410 returns to S115 and then selects an unprocessed pixel as the target pixel. If all the pixels have been processed (S125: YES), in S130 the CPU 410 determines whether all lines in the restoration region set on the target image have been processed as the target line. If there is an unprocessed line (S130: NO), the CPU 410 returns to S110 and selects an unprocessed line as the target line. If all the lines have been processed (S130: YES), the CPU 410 advances to S135.

In S135, the CPU 410 determines whether both the left-side original image HIL and the right-side original image HIR have been processed. If there is an unprocessed original image (S135: NO), the CPU 410 goes back to S100 and selects an unprocessed original image as the target image. If both the original images have been processed (S135: YES), the CPU 410 ends the pixel restoration process.

As described above, for pixels of the left-side restoration region AL, the values of pixels on the line L1 on the right side of the right end of the left-side original image HIL are determined on the basis of the values of a plurality of pixels on the lines La and Lb. Here, the lines La and Lb are along the right end of the left-side original image HIL. A plurality of pixels on the lines La and Lb is located in the left-side original image HIL and arranged along the right end of the left-side original image HIL.

Similarly, in the left-side restoration region AL, the values of pixels on the line L2 on the right side of the line L1 are determined on the basis of the values of a plurality of pixels on the lines L1 and La. In the left-side restoration region AL, the values of pixels on the line L3 on the right side of the line L2 are determined on the basis of the values of a plurality of pixels on the lines L1 and L2. In this manner, the pixel restoration process generates a plurality of pixels in the left-side restoration region AL by directly or indirectly using the values of a plurality of pixels on the lines La and Lb that are along the right end of the left-side original image HIL. A plurality of pixels inside the left-side restoration region AL is not included in the left-side original image HIL. The plurality of pixels inside the left-side restoration region AL is along the right end of the left-side original image HIL, and is arranged on the outer side of the left-side original image HIL (referred to as left-side restoration pixels).

Similarly to the left-side restoration region AL, the image restoration process generates a plurality of pixels inside the right-side restoration region AR by directly or indirectly using the values of a plurality of pixels on lines that are within the right-side original image HIR and along the left end of the right-side original image HIR. A plurality of pixels in the right-side restoration region AR is not included in the right-side original image HIR. The plurality of pixels in the right-side restoration region AR is along the left end of the right-side original image HIR, and is arranged on the outer side of the right-side original image HIR (referred to as right-side restoration pixels).

Both a band-like image consisting of a plurality of left-side restoration pixels in the left-side restoration region AL and a band-like image consisting of a plurality of right-side restoration pixels in the right-side restoration region AR represent a band-like image on the line VL of the original 10. Accordingly, the band-like image in the left-side restoration region AL and the band-like image in the right-side restoration region AR include portions that resemble each other.

The restoration regions AL and AR are regions that are adjacent to the original images HIL and HIR, respectively. However, in the buffer region 421, the image data including the restoration pixels inside the restoration region AL or AR are not necessarily integrated with the image data representing corresponding one of the original image HIL and the original image HIR. The image data including the restoration pixels inside the restoration region AL or AR may be a different from both the image data representing the original image HIL and the image data representing the original image HIR.

Figure 7:
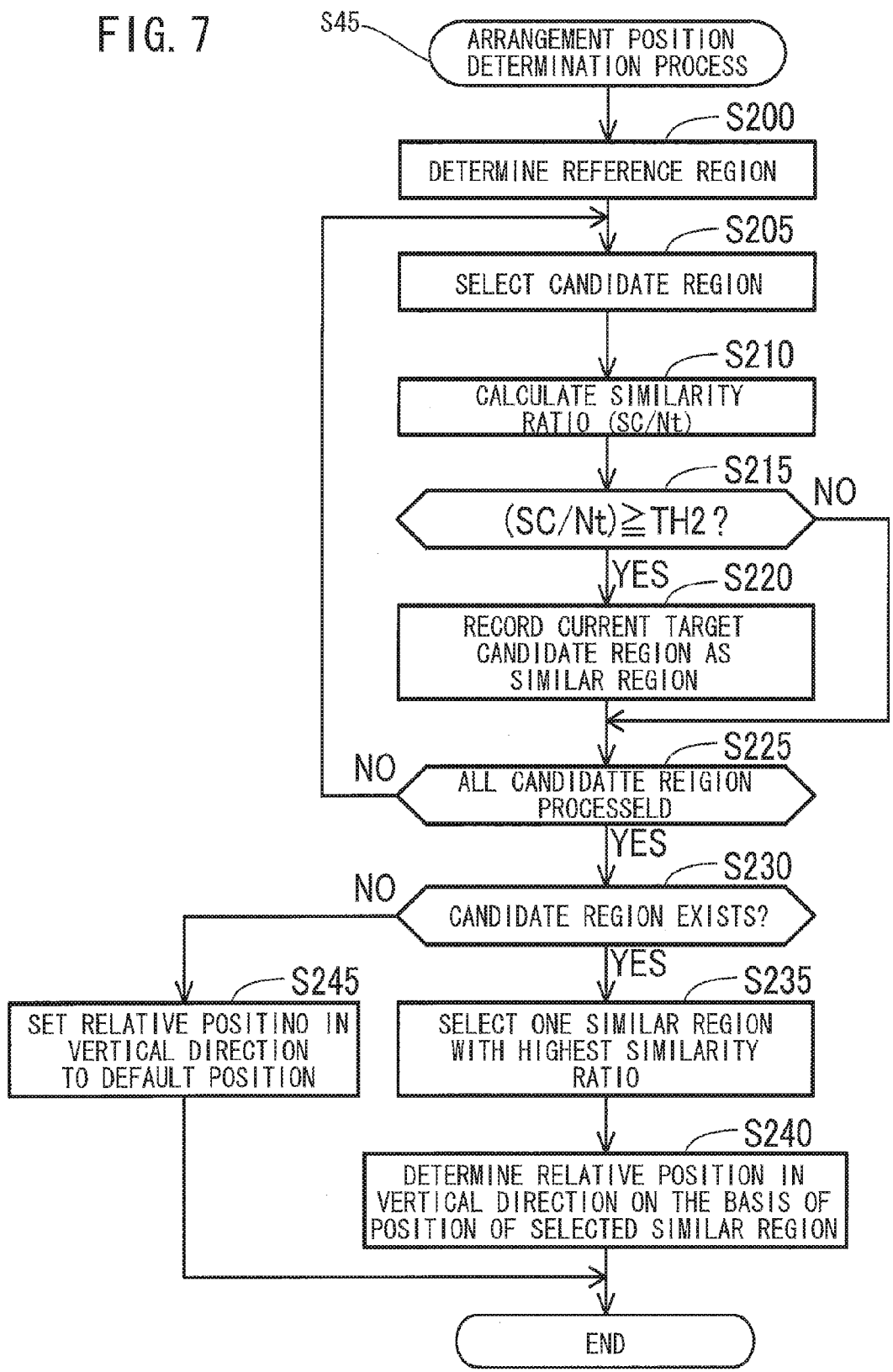
FIG. 7 is a flowchart for illustrating an arrangement position determination process according the first embodiment.

After the pixel restoration process is ended, in S45 (FIG. 2) the CPU 410 executes an arrangement position determination process. The arrangement position determination process is a process for determining the relative position between the left-side original image HIL and the right-side original image HIR in such a way that the left-side original image HIL and the right-side original image HIR can appropriately represent the original 10. FIG. 7 is a flowchart for illustrating the arrangement position determination process.

In S200, the CPU 410 determines a reference region CA. The reference region CA is set so as to include at least part of the right-side restoration region AR. In the embodiment, the entire right-side restoration region AR, that is, the entire image consisting of a plurality of right-side restoration pixels generated by the pixel restoration process, is set as the reference region CA. Instead, a part of the right-side restoration region AR may set as the reference region CA. Or, a region that includes the entire right-side restoration region AR and a part of the left end of the right-side original image HIR may be set as the reference region CA, from an image formed by the right-side restoration region AR and the right-side original image HIR.

Figure 8:
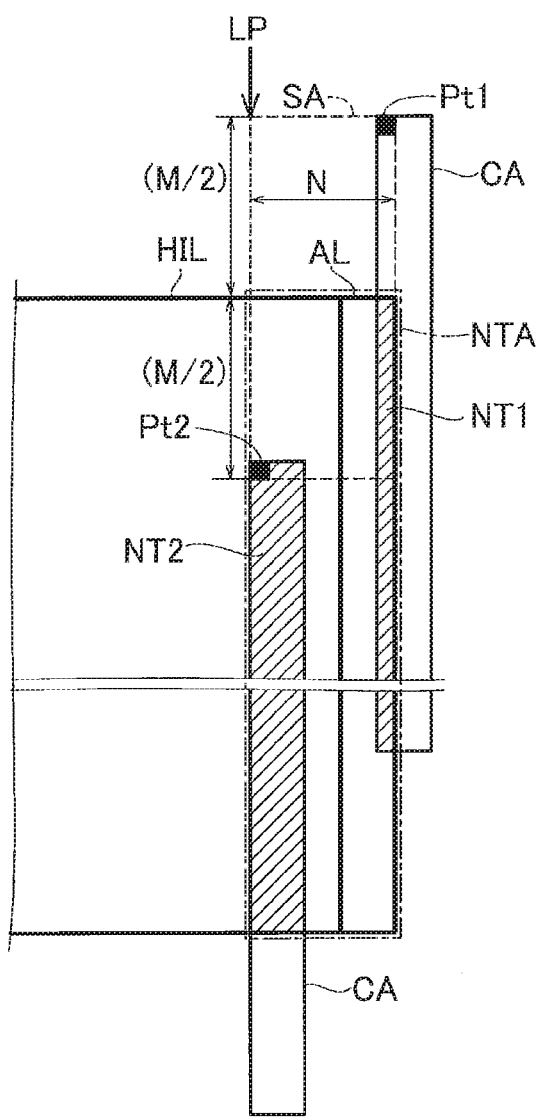
FIG. 8 is an enlarged view of an area surrounding a search region shown in FIG. 5(A)

In S205, the CPU 410 selects one target candidate region from among a plurality of candidate regions determined on the basis of a predetermined search region SA. For example, as shown in FIG. 5(A), the search region SA defines a range indicated by a broken line at the upper right portion of the left-side original image HIL. FIG. 8 is an enlarged view of an area near the search region SA shown in FIG. 5(A). The search region SA is a rectangular region having M pixels (vertical direction)×N pixels (horizontal direction) (M and N are integers greater than or equal to 2). For example, N is about 10, and M is between tens and hundreds. The right end of the search region SA matches the right end of the left-side restoration region AL in the right side of the left-side original image HIL. The center of the search region SA in the vertical direction is at the upper end of the left-side original image HIL.

The CPU 410 selects one target pixel-position from among the positions of (M×N) pixels inside the search region SA. The CPU 410 identifies, as an target candidate region, a region that is inside the left-side original image HIL or the restoration region AL, and that overlaps with the reference region CA if the reference region CA is disposed so that a pixel Pc (FIG. 5(A)) is positioned at the target pixel-position. Here, as shown in FIG. 5(A), the pixel Pc is a pixel in the reference region CA positioned an upper left end thereof. In this manner, the positions of (M×N) pixels inside the search region SA is in one-to-one correspondence with (M×N) candidate regions. For example, a hatched candidate region NT1 in FIG. 8 is identified when an upper-right pixel position Pt1 in the search region SA is set as the target pixel-position. A hatched candidate region NT2 in FIG. 8 is identified when a lower-left pixel position Pt2 in the search region SA is set as the target pixel-position. As shown in FIG. 8, the search region SA includes a left end at the position LP. A candidate region setting area NTA is an area within which a candidate region can be set, and is located on the right side of the position LP. In the embodiment, the candidate region setting area NTA includes the left-side restoration region AL and a portion of the left-side original image HIL. Here, the portion of the left-side original image HIL abuts to the right end of the left-side original image HIL.

For example, the target candidate region is initially set to the candidate region NT1 in FIG. 8. The CPU 410 moves the target pixel-position in the search region SA on a pixel-to-pixel basis in the vertical or horizontal direction from the pixel Pt1 for identifying the first candidate region NT1 to move the target candidate position sequentially, thereby identifying each target candidate region from among the (M×N) candidate regions. The target pixel-position is a position of a pixel in the search region SA for identifying the candidate region.

After one target candidate region is identified, in S210, the CPU 410 calculates a similarity ratio (SC/Nt) of the target candidate region. The similarity ratio (SC/Nt) of the target candidate region is an index value indicating the degree of similarity between the target candidate region and the reference region CA.

The calculation method of the similarity ratio (SC/Nt) will be explained. The CPU 410 selects each of a plurality of pixels in the target candidate region as a target pixel, and determines whether the target pixel is a similar pixel or a non-similar pixel. More specifically, the CPU 410 calculates a difference $\Delta VP$ between the component value of the target pixel in the target candidate region and the component value of a pixel in the reference region CA corresponding to the target pixel. The pixel in the reference region CA that corresponds to the target pixel is a pixel in the reference region CA that overlaps with the target pixel when the target candidate region is overlapped with the reference region CA so that the pixel Pc (FIG. 5(A)) is positioned at the target pixel-position. Here, the component values of the two pixels from which the difference $\Delta VP$ is calculated are (R1, G1, B1) and (R2, G2, B2). The difference $\Delta VP$ is represented by the sum of absolute values of differences of three types of component values, for example. That is, the difference $\Delta VP$ is the sum of an absolute value of (R1-R2), an absolute value of (G1-G2), and an absolute value of (B1-B2).

If the calculated difference $\Delta VP$ is less than or equal to a predetermined reference value TH1, the CPU 410 judges that the target pixel is a similar pixel. If the calculated difference $\Delta VP$ is greater than the predetermined reference value TH1, the CPU 410 judges that the target pixel is a non-similar pixel. This is because the color of the target pixel in the target candidate region is similar to the color of the pixel in the reference region CA corresponding to the target pixel when the difference $\Delta VP$ is less than or equal to the predetermined reference value TH1. The CPU 410 repeatedly performs the above determination for each pixel in the target candidate region.

The CPU 410 calculates the similarity ratio (SC/Nt) of the target candidate region by dividing the number of similar pixels SC in the target candidate region by the total number of pixels Nt in the target candidate region. The similarity ratio (SC/Nt) is a ratio of the number of similar pixels SC to the total number of pixels Nt in the target candidate region. The larger the similarity ratio (SC/Nt) is, the more the reference region CA is similar to the target candidate region.

In S215, the CPU 410 determines whether the similarity ratio (SC/Nt) is greater than or equal to a threshold value TH2. That is, the CPU 410 determines whether the current target candidate region is similar to the reference region CA.

If the similarity ratio (SC/Nt) is greater than or equal to the threshold value TH2, or if the CPU 410 judges that the current target candidate region is similar to the reference region CA (S215: YES), the CPU 410 in S220 records the current target candidate region as a similar region similar to the reference region CA assigned with the similarity ratio of the current target candidate region in the buffer region 421, and moves to S225.

If the similarity ratio (SC/Nt) is less than the threshold value TH2 (S215: NO), the CPU 410 skips S220 and moves to S225.

In S225, the CPU 410 determines whether all the (M×N) candidate regions have been processed as the target candidate region. If there is an unprocessed candidate region (S225: NO), the CPU 410 returns to S205, and selects the unprocessed candidate region as the target candidate region. If all the candidate regions have been processed (S225: YES), the CPU 410 moves to S230.

In S230, the CPU 40 determines whether the (M×N) candidate regions include at least one similar region. The CPU 410 determines whether there is at least one candidate region recorded in S220 as the similar region. If there is at least one similar region (S230: YES), in S235 the CPU 410 selects one similar region with the highest similarity ratio (SC/Nt), which is calculated in S210, from among the at least one similar region.

In S240, the CPU 410 determines, on the basis of the position of the one similar region selected, the relative arrangement position between the left-side original image HIL and the right-side original image HIR. In the embodiment, the CPU 410 determines the relative position in a direction along the ends of the original images HIL and HIR corresponding to the line VL. That is, the CPU 410 determines the relative position in the vertical direction of FIG. 8. More specifically, the CPU 410 identifies a pixel position Ps (see FIG. 5(B), for example) in the search region SA corresponding to the similar region selected in S235. For example, if the similar region selected in S235 is the candidate region NT1 in FIG. 8, the pixel position Pt1 in the search region SA is identified as the pixel position Ps in the search region SA corresponding to the similar region. That is, the pixel position Ps is the target pixel-position whose target candidate region is determined as the similar region in S235. The identified pixel position in the search region SA in the vertical direction is set as the position of an upper-end pixel in the vertical direction in the right-side original image HIR. The search region SA is set with a definite relation to the left-side original image HIL. Accordingly, the CPU 410 sets the relative position between the left-side original image HIL and the right-side original image HIR in the vertical direction. In the arrangement position determination process of the embodiment, the CPU 410 does not determine the relative position in the horizontal direction between the left-side original image HIL and the right-side original image HIR. This is because the relative position in the horizontal direction between the left-side original image HIL and the right-side original image HIR are set to a predetermined relative position as described later.

If there is no one similar region (S230: NO), in S245 the CPU 410 sets the relative position between the left-side original image HIL and the right-side original image HIR in the vertical direction to a default position. In the embodiment, the default position in the vertical direction is set to a position so that the upper end of the left-side original image HIL is aligned with the upper end of the right-side original image HIR.

After the relative position between the left-side original image HIL and the right-side original image HIR in the vertical direction has been determined in S240 or S245, the CPU 410 ends the arrangement position determination process.

After the arrangement position determination process is ended, in S50 (FIG. 2) the CPU 410 performs an arranged image generation process. The arranged image generation process is a process for generating one arranged image file representing an arranged image where the left-side original image HIL and the right-side original image HIR are arranged at the relative position in the vertical direction determined by the arrangement position determination process.

Figure 9:
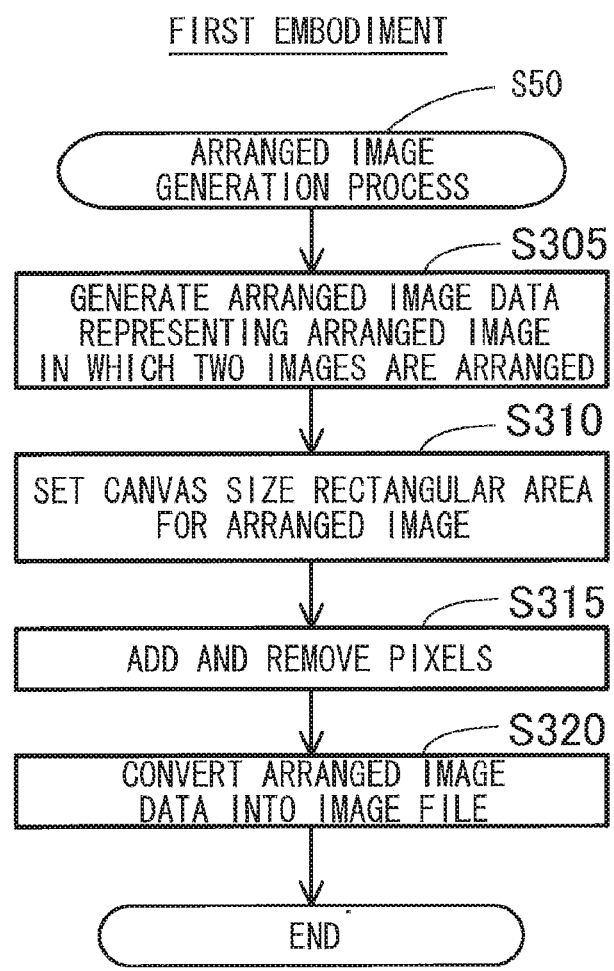
FIG. 9 is a flowchart illustrating an arranged image generation process according the first embodiment.

FIG. 9 is a flowchart illustrating the arranged image generation process. In S305, the CPU 410 generates arranged image data representing one arranged image where the two original images HIL and HIR have been arranged at the arrangement position determined. FIG. 5(B) shows one example of an arranged image BI1. As shown in FIG. 5(B), the two original images HIL and HIR are arranged in the arranged image BI1. The arranged image BI1 is an image representing one original 10 with the two original images HIL and HIR. In the arranged image BI1, the relative position between the left-side original image HIL and the right-side original image HIR in the vertical is determined in the arrangement position determination process. For example, FIG. 5(B) shows an example in which the relative position in the vertical direction determined in S240 is different from the default position. In the arranged image BI1 shown in FIG. 5(B), the pixel position Ps is aligned with the upper end of the right-side original image HIR with respect to the vertical direction. Here, as described above, the pixel position Ps is positioned in the search region SA in the left-side original image HIL. As a result, there is a gap of AH in the vertical direction between the upper end of the left-side original image HIL and the upper end of the right-side original image HIR. If in S245 the relative position in the vertical direction has been set to the default position, the two original images HIL and HIR are arranged in such a way that the upper end of the left-side original image HIL is aligned with the upper end of the right-side original image HIR in the arranged image (not shown).

The relative position in the horizontal direction between the left-side original image HIL and the right-side original image HIR in the arranged image BI1 is determined in advance regardless of the arrangement position determination process. More specifically, the two original images HIL and HIR in the arranged image BI1 are arranged so that there is a specific gap of ΔIT between the right end of the left-side original image HIL and the left end of the right-side original image HIR. In the embodiment, the specific gap of ΔIT is equal to the width ΔW of the above-described restoration regions AL and AR, and is equal to three pixels, for example. A plurality of left-side restoration pixels in the left-side restoration region AL and a plurality of right-side restoration pixels in the right-side restoration region AR are not arranged in the arranged image BI1. The values of pixels constituting the specific gap of ΔIT are equal to a value representing white, for example.

In S310, as shown in FIG. 5(C), the CPU 410 sets a canvas-size rectangular area CS for the arranged image BI1. The size of the rectangular area CS is determined on the basis of the canvas size information acquired in S25. More specifically, the rectangular area CS is set on the arranged image BI1 in such a way that the vertical- and horizontal-direction center of the rectangular area CS is aligned with the vertical- and horizontal-direction center of the arranged image BI1.

In S315, the CPU 410 performs an addition of pixels to the arranged image BI1 and a removal of pixels from the arranged image BI1 on the basis of the rectangular area CS. In this manner, the CPU 410 generates arranged image data representing an arranged image BI2 whose size has been adjusted (FIG. 5(C)). More specifically, pixels of a predetermined color (e.g., white) are added to a region AP. Here, the region AP is a region inside the rectangular area CS and outside the arranged image BI1. Pixels in a region DP are removed from the arranged image BI1. The region DP is a region outside the rectangular area CS in the arranged image BI1. As a result, arranged image data is generated. The arranged image data represents an arranged image BI2 of a size specified by a user.

In S320, the CPU 410 converts the arranged image data into an image file of a predetermined format, thereby generating an arranged image file representing the arranged image BI2. For example, the arranged image data, which is RGB image data, is converted into JPEG format. As a result, the JPEG-format arranged image file is generated.

In S55 of FIG. 2, the CPU 410 transmits the generated arranged image file to the multifunction peripheral 200. The CPU 210 of the multifunction peripheral 200 receives the arranged image file, and stores the received arranged image file in the non-volatile storage device 230. The CPU 210 also notifies a user that the arranged image file has been received. The arranged image file will be used by the user. For example, in response to a command from the user, the multifunction peripheral 200 prints the arranged image BI2 using the arranged image file.

According to the embodiment described above, as shown in FIG. 6, the plurality of right-side restoration pixels in the restoration region AR is generated so as to be along the left end of the right-side original image HIR by using the values of the plurality of pixels arranged that is positioned within the right-side original image HIR and arranged along the left end of the right-side original image HIR. As shown in FIG. 7, the relative position between the left-side original image HIL and the right-side original image HIR is determined by using the plurality of right-side restoration pixels. As a result, when the arranged image file is generated in the arranged image generation process of FIG. 9, the arrangement position between the left-side original image HIL and the right-side original image HIR can be determined accurately.

The band-like image on the line VL of the original 10 appears neither on the original image HIL nor the original image HIR. If the relative position in the vertical direction between the original images HIL and HIR is determined without generating a plurality of right-side restoration pixels, the relative vertical-direction positions may not be accurately decided. In the embodiment, the right-side restoration pixels are generated, and the right-side restoration pixels are used to accurately determine the relative position between the original images HIL and HIR in the vertical-direction.

The plurality of left-side restoration pixels in the restoration region is generated so as to be along the right end of the left-side original image HIL using the values of a plurality of pixels that is positioned within the left-side original image HIL and arranged along the right end of the left-side original image HIL. As shown in FIG. 7, the relative position between the left-side original image HIL and the right-side original image HIR is determined by using the plurality of left-side restoration pixels. As a result, when the arranged image file is generated, the arrangement position between the left-side original image HIL and the right-side original image HIR can be determined more accurately. For example, if an image consisting of the plurality of left-side restoration pixels is similar to an image consisting of the plurality of right-side restoration pixels, the arrangement position between the left-side original image HIL and the right-side original image HIR can be determined appropriately on the basis of the degrees of similarity between the two images.

More specifically, the CPU 410 identifies the position of an image similar to the image in the reference region CA from the candidate region setting area NTA (FIGS. 5(A) and 8) using an image in the reference region CA having a plurality of right-side restoration pixels and also using an image in the candidate region setting area NTA including a plurality of left-side restoration pixels (S200 to S235 in FIG. 7). The CPU 410 determines the relative position between the two original images HIL and HIR on the basis of the position of the image in the candidate region similar to the image in the reference region CA (S240 in FIG. 7). As a result, through a comparison between the image having a plurality of right-side restoration pixels and the image having a plurality of left-side restoration pixels, the relative position between the two original images HIL and HIR can be determined more accurately.

In the embodiment, the reference region CA is the entire right-side restoration region AR (FIG. 5(A)). The reference region CA contains a predetermined number of lines (three in this example) consisting of a plurality of right-side restoration pixels. Each of the lines of the reference region CA has a plurality of right-side restoration pixels that continuously extends along the left end of the right-side original image HIR from one end to another end with respect to a direction parallel the left end. In other words, each of the lines of the reference region CA has a length equal to the total length of the right-side original image HIR in the vertical direction.

For example, compared with a case where right-side restoration pixels are generated only for a portion of a region along the left end of the right-side original image HIR, the above configuration can appropriately determine the relative position between the two original images HIL and HIR.

As shown in FIG. 5(A), the reference region CA includes a plurality of right-side restoration pixels in the right-side restoration region AR and does not include pixels in the right-side original image HIR. The original images HIL and HIR are obtained by reading both sides of the half-folded original 10. Therefore, there is no region of the original 10 that would appear on both the images HIL and HIR. Thus, it is sufficient for the reference region CA to include a plurality of right-side restoration pixels, and there is no need for the reference region CA to contain pixels in the right-side original image HIR. As a result, the relative position between the two original images HIL and HIR can be determined even more appropriately.

As shown in FIG. 8, the candidate region setting area NTA includes a plurality of left-side restoration pixels in the left-side restoration region AL and pixels in the left-side original image HIL. There is a high probability that a similar image to the image in the reference region CA (the restoration region AR) exists in the left-side restoration region AL. Here, the image in the restoration region AR is restored on the basis of the right-side original image HIR. However, there is a possibility that the similar image exists in the left-side original image HIL depending on the width ΔW of the right-side restoration region AR, for example. Accordingly, the candidate region setting area NTA includes a plurality of left-side restoration pixels in the left-side restoration region AL and pixels in the left-side original image HIL. Therefore, the relative position between the two original images HIL and HIR can be determined even more appropriately.

The relative position determined by the arrangement position determination process are the position in the vertical direction, that is, the position in the direction along the left end of the right-side original image HIR. In the arranged image generation process (FIG. 9), the two original images HIL and HIR are arranged in the arranged image BI2 with a specific gap of ΔIT therebetween in the horizontal direction, that is, the direction perpendicular to the left end of the right-side original image HIR (FIGS. 5(B) and 5(C)). The two original images HIL and HIR are disposed in the arranged image BI2 according to the relative position in the vertical direction determined by the arrangement position determination process (FIGS. 5(B) and 5(C)). As described above, the original images HIL and HIR are obtained by reading both sides of the half-folded original 10. Therefore, there is no partial region in the original 10 whose image appears on both the original images HIL and HIR. Accordingly, it is inappropriate that the images are disposed in the arranged image BI2 so that a part of the left-side original image HIL neighboring the right end thereof overlaps with a part of the right-side original image HIR neighboring the left end thereof. As described above, the two original images HIL and HIR lack the band-like image corresponding to the line VL of the original 10. In view of the above-mentioned facts, it is appropriate to arrange the two original images HIL and HIR with a specific gap ΔIT therebetween in the arranged image BI2. The specific gap ΔIT corresponds to the width of the missing band-like image.

In the embodiment, the values of pixels in the gap ΔIT are a fixed value representing white. The width of the gap ΔIT is relatively short (e.g., three pixels). Therefore, even if the gap ΔIT is white, the gap ΔIT does not excessively stand out on the arranged image BI2. Especially when the arranged image BI2 is printed, a blurring of coloring material would occur. Therefore, on the printed arranged image BI2, the gap ΔIT does not excessively stand out.

If the relative position between the two original images HIL and HIR cannot be determined on the basis of a similar region during the arrangement position determination process of FIG. 7 (S230 of FIG. 7: NO), the relative position between the two original images HIL and HIR in the vertical direction is set to default position (S245 of FIG. 7). In this case, the two original images HIL and HIR are disposed in the arranged image BI2 so that the relative position in the vertical direction is set to the predetermined position. Accordingly, the above-described configuration can generate an arranged image file, even if the relative position between the two original images HIL and HIR in the vertical direction cannot be determined with the use of a plurality of right-side restoration pixels.

In the embodiment, the CPU 410 acquires the canvas size information showing a specific size of an image to be generated (S25 of FIG. 2). The CPU 410 performs an addition of pixels to the arranged image BI1 and a removal of pixels in the arranged image so that the size of the arranged image BI1 is adjusted to the specific size (S315 of FIG. 9). As a result, the size of the arranged image BI2 can be adjusted to an appropriate size, or more specifically to a size that a user requires.

The right-side original image HIR is an example of a first image, and the left-side original image HIL is an example of a second image. The right-side restoration pixels in the right-side restoration region AR are an example of first pixels, and the left-side restoration pixels in the left-side restoration region AL are an example of second pixels. The image in the reference region CA is an example of a first determination image, and the image inside the candidate region setting area NTA is an example of a second determination image.

B. Second Embodiment

In a second embodiment, an arranged image generation process is different from that of the first example. FIG. 10 is a flowchart illustrating the arranged image generation process of the second example.

Similarly to S305 (FIG. 9), in S305b, the CPU 410 generates arranged image data representing one arranged image where two original images HIL and HIR have been arranged at the determined arrangement position. In the second embodiment, the CPU 410 determines a relative position between the left-side original image HIL and the right-side original image HIR in the horizontal direction on the basis of the position of a similar region selected in S235, in addition to the relative position between the left-side original image HIL and the right-side original image HIR in the vertical direction. More specifically, the CPU 410 identifies a pixel position Ps in the search region SA corresponding to the similar region selected in S235. For example, if the similar region selected in S235 is a candidate region NT1 shown in FIG. 8, the CPU 410 identifies a pixel position Pt1 of the search region SA as the pixel position Ps in the search region SA corresponding to the similar region. The CPU 410 sets a horizontal position of the identified pixel position Ps as the position of the left end of the right-side original image HIR in the horizontal direction. A gap ΔIT may exist or not between the right end of the left-side original image HIL and the left end of the right-side original image HIR in the arranged image BI1. More specifically, in the second embodiment, if the gap ΔIT exists between the right end of the left-side original image HIL and the left end of the right-side original image HIR, the CPU 410 generates lines corresponding to the gap ΔIT. Here, the number of generated lines is set to one to five pixels worth of lines in the second embodiment.

In S306b, the CPU 410 determines whether the gap ΔIT exists between the right end of the left-side original image HIL and the left end of the right-side original image HIR in the arranged image BI1. If the gap ΔIT exists (S306b: YES), in 5307B the CPU 410 determines a coefficient (or a parameter) for restoring the number of lines corresponding to the gap ΔIT, in accordance with the width of the gap ΔIT. Then, in S308b the CPU 410 determines the number of lines corresponding to the gap ΔIT, by using the determined coefficient.

The right section of FIG. 10 shows an example in which the width of the gap ΔIT is three pixels. For example, the pixels that exist in the gap ΔIT are generated with the use of at least one pixel at the left end of the right-side original image HIR that is located on the right side of the pixels in the gap ΔIT, and at least one pixel at the right end of the left-side original image HIL that is located on the left side of the pixels in the gap ΔIT. For example, in FIG. 10, the values of three pixels X1, X2, and X3 in the gap ΔIT are determined on the basis of the value of a pixel L of the left-side original image HIL and the value of a pixel R of the right-side original image HIR. In this example, the vertical position of the pixels R and L is the same as that of the pixels X1, X2, and X3.

Specific component values (e.g., R-component values) Vx1 to Vx3 of the pixels X1 to X3 are calculated by the following equations (2) with the use of specific component values Vl and Vr of the pixels L and R, respectively.

$$Vx1 = Kl1 \times Vl + Kr1 \times Vr$$

$$Vx2 = Kl2 \times Vl + Kr2 \times Vr$$

$$Vx3 = Kl3 \times Vl + Kr3 \times Vr \quad (2)$$

Coefficients Kl1-Kl3 corresponds to the pixels X1-X3, respectively. Each of coefficients Kl1-Kl3 is determined on the basis of the distance from the pixel L to a corresponding one of the pixels X1 to X3. The shorter the distance from the pixel L to each of the pixels X1-X3 is, the larger value the corresponding one of the coefficients Kl1 to Kl3 is set to. Coefficients Kr1-Kr3 corresponds to the pixels X1-X3, respectively. Each of coefficients Kr1-Kr3 is determined on the basis of the distance from the pixel R to a corresponding one of the pixels X1 to X3. The shorter the distance from the pixel R to each of the pixels X1-X3 is, the larger value the corresponding one of the coefficients Kr1 to Kr3 is set to. Kl1-Kl3 and Kr1-Kr3 satisfies the following equations, (Kl1+Kr1)=1, (Kl2+Kr2)=1, and (Kl3+Kr3)=1. For example, as shown in FIG. 10, Kl1=(¾), Kr1=(¼), Kl2=(2/4), Kr2=(2/4), Kl3=(¼), and Kr3=(¾).

In S308b, the CPU 410 determines the values of all pixels in the gap ΔIT between the right end of the left-side original image HIL and the left end of the right-side original image HIR.

If there is no gap ΔIT (S306b: NO), the CPU 410 skips S307b and S308b.

The processes of S310 to S320 of FIG. 10 are the same as those of S310 to S320 of FIG. 9, and are therefore not explained.

According to the second example described above, the CPU 410 generates (or restores) a plurality of pixels (e.g. pixels X1 to X3 shown in FIG. 10) constituting of the gap ΔIT between the left-side original image HIR with the use of a pixel (e.g. pixel L shown in FIG. 10) of the left-side original image HIL and a pixel (e.g. pixel R shown in FIG. 10) of the right-side original image HIR. As a result, appropriate pixels can be generated for the gap ΔIT of the arranged image BI2, by using the pixel of the left-side original image HIL and the pixel of the right-side original image HIR.

C. Modifications (1) In the above embodiments, the left-side restoration pixels are generated in the left-side restoration region AL with the use of pixels of the left-side original image HIL, and the right-side restoration pixels are generated in the right-side restoration region AR with the use of pixels of the right-side original image HIR. Alternatively, either one of the left-side restoration pixels and the right-side restoration pixels may be generated. For example, if only the right-side restoration pixels are generated with no left-side restoration pixel generated, the reference region CA is a region consisting of the right-side restoration pixels as in the case of the first embodiment, and the candidate region setting area NTA is an area that only includes a region in the left-side original image HIL near the right end thereof, unlike the first embodiment. If only the left-side restoration pixels are generated with no right-side restoration pixel generated, the reference region CA is a region in the right-side original image HIR near the left end thereof unlike the first embodiment, and the candidate region setting area NTA is an area that includes a region of the left-side original image HIL near the right end thereof and a region consisting of left-side restoration pixels as in the case of the first example.

(2) In the above embodiments, a plurality of left-side restoration pixels in the left-side restoration region AL is generated along the right end of the left-side original image HIL so as to have the entire length of the left-side original image HIL in the vertical direction. Alternatively, the left-side restoration pixels may be generated only in a partial region near the vertical central portion of the left-side original image HIL along the right end thereof. Similarly to this alternative example of the left-side restoration region AL, a plurality of right-side restoration pixels of the right-side restoration region AR is generated in a partial region near the vertical central portion of the right-side original image HIR along the left end thereof.

(3) In the embodiments, the reference region CA is the entire right-side restoration region AR. That is, the reference region CA only includes a plurality of right-side restoration pixels in the right-side restoration region AR. Alternatively, the reference region CA may include a plurality of right-side restoration pixels in the right-side restoration region AR and several lines of pixels in the right-side original image HIR from the left end thereof adjacent to the right-side restoration region AR. In the above embodiment, the candidate region setting area NTA includes the entire left-side restoration region AL and a part of the left-side original image HIL near the right end thereof. Alternatively, the candidate region setting area NTA may include only the left-side restoration region AL and may not include the left-side original image HIL.

(4) In the embodiments, an image file representing an image including the two original images HIL and HIR is generated by reading both sides of the original 10 that is folded in half along the line VL (S15 of FIG. 2). Alternatively, the original 10 may be cut along the line VL and be physically separated into two. The two pieces of the original 10 may be read in two passes and generates an image file representing an image including the two original images HIL and HIR.

(5) In the arrangement position determination process according to the embodiments, the steps of determining a similar region similar to the reference region CA (S210-S220 of FIG. 7) are one example and are not limited to this. For example, before calculating the similarity ratio (SC/Nt), the CPU 410 may calculate only the number of similar pixels SC. In such a case, if the number of similar pixels SC is less than a threshold value THsc, the CPU 410 determines that the target candidate region is not similar to the reference region CA without calculating the similarity ratio (SC/Nt), and performs processes on the next target candidate region. If the number of similar pixels SC is greater than or equal to the threshold value THsc, the CPU 410 calculates the similarity ratio (SC/Nt). If the similarity ratio (SC/Nt) is greater than or equal to a threshold value TH2, the CPU 410 determines that the target candidate region similar to the reference region CA. In some cases, the number of pixels of the target candidate region is relatively low because of a small region where the reference region CA overlaps with the candidate region setting area NTA. Such an target candidate region is unlikely to be a similar region. However, because of a small number of pixels, the target candidate region could be incorrectly determined as a similar region if the determination is made only on the similarity ratio (SC/Nt). According to this modification, such problem can be avoided.

(6) In the embodiments, an arranged image file is generated so as to represent an arranged image in which the left-side original image HIL and the right-side original image HIR are arranged side by side in the horizontal direction. Alternatively, an arranged image file may be generated so as to represent an arranged image where one original image and another original image are arranged side by side in the vertical direction. In this case, a plurality of restoration pixels may be generated along a lower end of the one original image, and a plurality of restoration pixels may be generated along an upper end of the another original image, for example. In this case, the relative position between the one original image and the another original image in the arranged image is determined by using those restoration pixels.

(7) In the embodiments, two image files are used to generate arranged image data representing an arranged image where the two original images are arranged. However, the present disclosure is not limited to this. Any number of image files may be used to generate one set of arranged image data. For example, four image files may be used to generate an arranged image file representing an arranged image where four original images are arranged.

(8) In the embodiments, the scanner unit 250 of the multifunction peripheral 200 reads the original to generate the two image files that are used to generate the arranged image data. Alternatively, a digital camera may take pictures of both sides of the half-folded original 10 to generate the two image files.

(9) The processes performed by the CPU 410 of the server 400 (S30-S50 of FIG. 2, for example) may be performed by the CPU 210 of the multifunction peripheral 200. In this case, the image processing system 1000 may not have the server 400 and the multifunction peripheral 200 may perform the entire process of FIG. 2. Alternatively, the processes performed by the CPU 410 of the server 400 may be performed by a CPU (not shown) of the personal computer 500. For example, the CPU (not shown) of the personal computer 500 may execute a scanner driver program installed in the personal computer 500 to execute the processes of the CPU 410. The server 400 is a single computing machine in the embodiments. However, the server 400 may be a computing system including a plurality of computing machines capable of communicating each other.

(10) Part of the configurations implemented in hardware in the embodiments described above may be replaced by software and, conversely, part of the configurations implemented in software may be replaced by hardware.

When all or part of the functions in the present disclosure are implemented by computer programs, the programs can be stored on a computer-readable storage medium (a non-temporary storage medium, for example). The programs may be used from the same storage medium on which they are provided (an example of a computer-readable storage medium), or may be first loaded onto a different storage medium (an example of a computer-readable storage medium). The "computer-readable storage medium" may be a portable medium, such as a memory card or CD-ROM; an internal storage device built into the computer, such as any of various ROM; or an external storage device, such as a hard disk drive connected to the computer.

While the disclosure has been described in detail with reference to the above embodiments thereof, it would be apparent to those skilled in the art that various changes and modifications may be made therein.

What is claimed is:

1. An image processing device comprising:
a processor; and
a memory storing computer-readable instructions therein, the computer-readable instructions, when executed by the processor, causing the image processing device to perform:
acquiring first image data representing a first image and second image data representing a second image, the first image showing a part of a target object and the second image showing another part of the target object, the first image including a first edge;
generating a plurality of first pixels so as to be arranged outside the first image and along the first edge by using a plurality of pixels that are arranged inside the first image and along the first edge, the plurality of first pixels not being included in the first image;
determining a relative position between the first image and the second image by using the plurality of first pixels; and
generating arranged image data representing an arranged image in which the first image and the second image are arranged according to the relative position so that the arranged image shows the target object.

2. The image processing device according to claim 1, wherein the second image includes a second edge, the first edge and the second edge being arranged side by side in the arranged image,
wherein the computer-readable instructions, when executed by the processor, causes the image processing device to further perform:
generating a plurality of second pixels so as to be arranged outside the second image and along the second edge by using a plurality of pixels that are arranged inside the second image and along the second edge, the plurality of second pixels not being included in the second image;
wherein the determining determines the relative position by further using the plurality of second pixels.

3. The image processing device according to claim 2, wherein the determining includes:
setting a first determination image and a second determination image, the first determination image including the plurality of first pixels and the second determination image including the plurality of second pixels;
detecting a similar image in the second determination image, the similar image being similar to at least part of the first determination image by using the first determination image and the second determination image; and
determining the relative position by using a position of the similar image.

4. The image processing device according to claim 3, wherein the first determination image includes prescribed number of pixel lines,
wherein each of the prescribed number of pixel lines includes the plurality of first pixels that is consecutively arranged along the entire first edge.

5. The image processing device according to claim 3, wherein the first determination image includes the plurality of first pixels and does not include a pixel in the first image.

6. The image processing device according to claim 5, wherein the second determination image includes the plurality of second pixels and at least part of pixels in the second image.

7. The image processing device according to claim 1, wherein the relative position indicates a position with respect to a first direction parallel to the first edge,
wherein the generating generates the arranged image so that the first image and the second image are arranged with a specific gap therebetween, the gap having a width in a second direction orthogonal to the first direction and that the first image and the second image are arranged in the arranged image according to the relative position.

8. The image processing device according to claim 7, wherein the computer-readable instructions, when executed by the processor, causes the image processing device to further perform:

generating a plurality of third pixels positioned in the specific gap by using pixels in the first image and pixels in the second image.

9. The image processing device according to claim 1, wherein when the relative position is not determinative, the generating generates the arranged image so that the first image is at a prescribed position to the second image in a direction parallel to the first edge.

10. The image processing device according to claim 1, wherein the computer-readable instructions, when executed by the processor, causes the image processing device to further perform:

acquiring size information indicating a specific size; and generating adjusted arranged image data representing an adjusted arranged image by at least one of adding a pixel to the arranged image and removing a pixel from the arranged image so that the adjusted arranged image has the specific size.

11. The image processing device according to claim 1, wherein the acquiring acquires the first image data and the second image data by optically reading both sides of a folded sheet that is folded a sheet, an original image being formed on the sheet, the original image being the target object, wherein the first edge corresponds to an folding line of the folded sheet.

12. A non-transitory computer readable storage medium storing a set of program instructions installed on and executed by a computer, the program instructions comprising:

acquiring first image data representing a first image and second image data representing a second image, the first image showing a part of a target object and the second image showing another part of the target object, the first image including a first edge;

generating a plurality of first pixels so as to be arranged outside the first image and along the first edge by using a plurality of pixels that are arranged inside the first image and along the first edge, the plurality of first pixels not being included in the first image;

determining a relative position between the first image and the second image by using the plurality of first pixels; and generating arranged image data representing an arranged image in which the first image and the second image are arranged according to the relative position so that the arranged image shows the target object.

13. A method comprising:

acquiring first image data representing a first image and second image data representing a second image, the first image showing a part of a target object and the second image showing another part of the target object, the first image including a first edge;

generating a plurality of first pixels so as to be arranged outside the first image and along the first edge by using a plurality of pixels that are arranged inside the first image and along the first edge, the plurality of first pixels not being included in the first image;

determining a relative position between the first image and the second image by using the plurality of first pixels; and generating arranged image data representing an arranged image in which the first image and the second image are arranged according to the relative position so that the arranged image shows the target object.

* * * * *